United States Patent [19]

Kelly et al.

[11] 3,997,874

[45] Dec. 14, 1976

[54] TIME DIVIDED SWITCHING AND CONCENTRATION APPARATUS

[75] Inventors: Michael J. Kelly, Melrose Park; Alex W. Kobylar, Chicago; Satyan G. Pitroda, Villa Park, all of Ill.

[73] Assignee: GTE Automatic Electric Laboratories Incorporated, Northlake, Ill.

[22] Filed: Sept. 24, 1975

[21] Appl. No.: 616,474

[52] U.S. Cl. .................. 340/172.5; 179/15 AT
[51] Int. Cl.² .................. H04J 3/00; G06F 1/00
[58] Field of Search ......... 340/172.5; 179/15 AT, 179/15 AQ

[56] References Cited
UNITED STATES PATENTS 3,883,855   5/1975   Brightman et al. ............ 340/172.5

Primary Examiner—Raulfe B. Zache

[57] ABSTRACT

Switching apparatus is disclosed having a time divided switching network for use in switching time division multiplexed channels employing PCM codes. The network employs two data memories for selectively storing received PCM codes in locations associated with specific transmission channels. These memories are addressed alternately by sequential addressing apparatus and additional memory apparatus which store selected addressing codes. These addressing codes are determined by a control unit to effect shifts in the channel assignments of respective codes by selectively transferring such codes between the data memories, thereby effecting the necessary time divided connections.

12 Claims, 12 Drawing Figures ns or time switched points. A similarly constructed central office channel bus is also coupled to the time divided switching network to connect such network to a central office.

A first of the memories of the time divided switching network, the buffer memory, is coupled to the subscriber channel bus and has sufficient storage capacity to store the data of all of the channels of that bus. A second of the memories, the information memory, is coupled to the central office channel bus and has, in the preferred embodiment, only one half the capacity of the buffer memory for channel data storage. The clock of the time divided network operates with two principal phases and several sub-phases to control the gating of channel data into, out of, and between the memories. It also generates sequential addressing information for the buffer memory and information memories during selected clock phases. During other phases addressing information for the memories is provided by selected additional control memories as will be described below. This latter addressing information is stored in such control memories under the control of a local processing unit in response to signaling information extracted from each channel.

TIME DIVIDED SWITCHING AND CONCENTRATION APPARATUS

This invention relates to the field of switching apparatus and more specifically to time divided switching apparatus.

In recent years digital transmission employing time divided channels using pulse code modulation (PCM) has become of greater significance, particularly for toll or long distance network trunks. As a result, numerous systems have been explored for performing switching of such PCM encoded channels. Many of these prior art systems have employed digital to analog converters to convert from PCM signals or codes back to analog before switching is accomplished. Some systems, however, have been developed for accomplishing such switching without converting the PCM signals to analog by employing a time divided switching network. One such is described in "An Introduction to PCM Switching", B. J. Rekiere and M. J. Kelly, *Automatic Electric Technical Journal*, April, 1971, Page 234.

Application of time divided switching techniques is not limited to the toll network; rather, such techniques may also be applied to the switching of subscriber lines. In particular, where time division multiplexing is used for subscriber lines, time divided switching is especially useful to perform functions previously performed using space division networks.

In the subscriber environment, remote switching capability (remote from the central office) is often desirable, particularly for handling calls within an area having a high community of interest. In addition, in such situations it is also advantageous to perform line concentration. Our invention comprises switching apparatus suitable for use remotely from a central office and employing time divided switching techniques to directly switch PCM encoded signals. While the invention is not limited to the subscriber environment, the preferred embodiment of the invention is intended to be used in that environment.

More specifically, it is an object of this invention to provide improved switching apparatus.

It is a more specific object of this invention to provide remote switching and concentration apparatus employing a time divided switching network.

It is a further object of this invention to provide a remote switching and concentration network employing, exclusively, selective data transfers between memory devices to effect switching functions.

These and other objects and features of the invention will become apparent upon reading the following specification, with the attached drawings, together with the appended claims.

In an illustrative embodiment employing principles of our invention, a plurality of individual transmission lines each conducting a plurality of time division multiplexed, PCM encoded subscriber channels (time slots) are connected to line equipment and multiplexing equipment. The line equipment and multiplexing equipment extract supervisory information relative to the individual channels and multiplex all of the channels of the plurality of individual transmission lines onto a single subscriber channel bus having a plurality of bit lines. The subscriber channel bus is coupled to a time divided switching network including a plurality of memories, a clock, and control mechanism to effect all switching operations exclusive of conventional cross-

IN THE DRAWINGS

Figure 1:
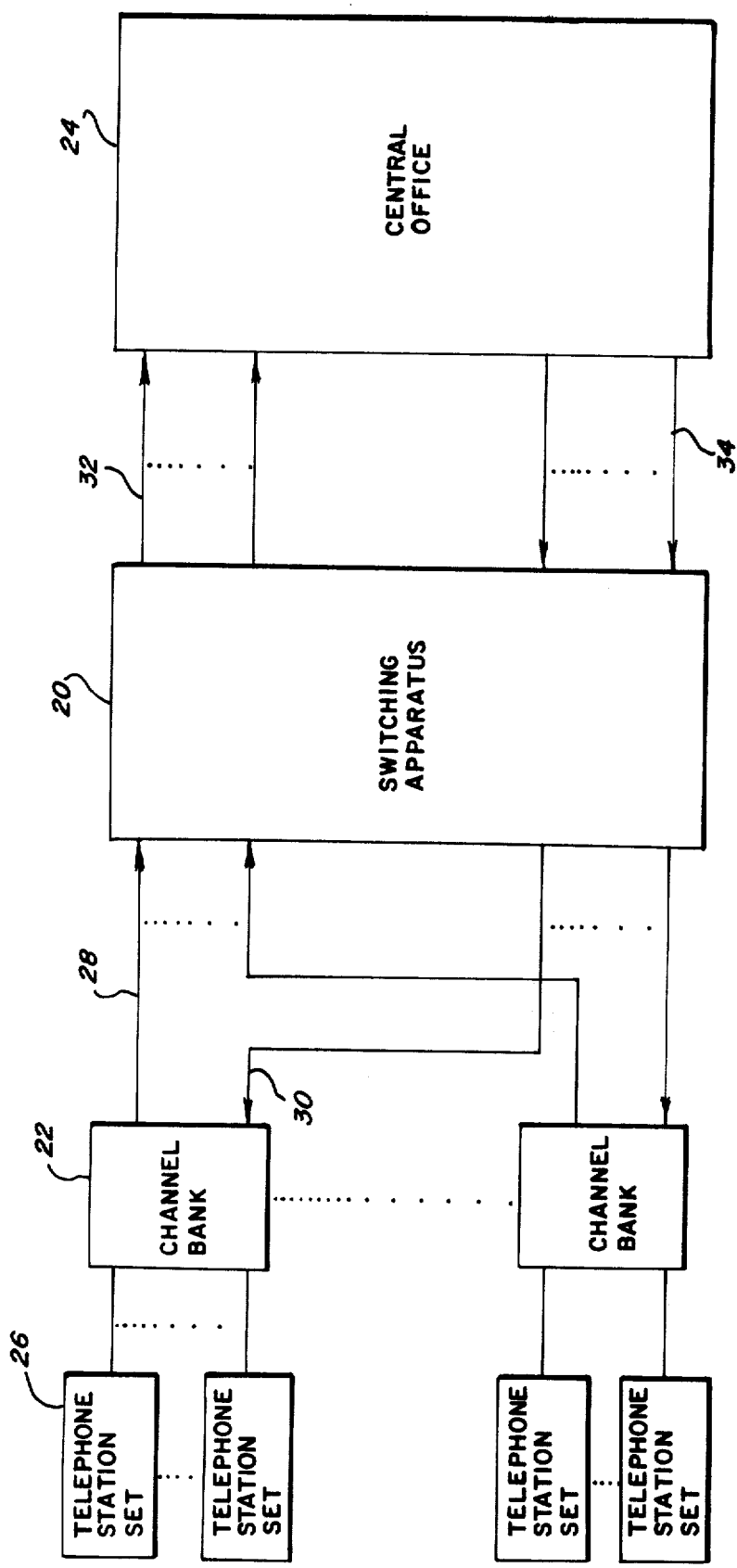
FIG. 1 is a general block diagram of a switching system for using switching apparatus employing principles of the invention.

In FIG. 1 switching apparatus 20 employing teachings of this invention is interposed between a plurality of channel banks 22 and a central office 24. The channel banks 22 may be of a type well known to those skilled in the art; see *Bell System Technical Journal*, October, 1972, Pages 1641 – 1743. They are coupled to a plurality of telephone station sets 26 and convert analog signals generated by such telephone station sets into 8 bit PCM codes. In the preferred embodiment each channel bank generates, on an ouput line 28, PCM codes for 24 channels (and, thus, 24 station sets); these codes appear sequentially in time divided slots (time slots) as is known to those skilled in the art. Each channel bank is also coupled to an input line 30 for receiving similarly encoded PCM signals which are converted by the channel bank into analog signals for application to each of the respectively connected telephone station sets 26. In the preferred embodiment, there are 8 such channel banks, each serving 24 station sets, for a total of 192 station sets. The specific numbers of channels, channel banks and station sets are merely illustrative.

The central office 24 is coupled to the switching apparatus 20 by a plurality of lines 32, similar to lines 28, and a plurality of output lines 34 similar to the lines 30. The central office may be one of many known in the prior art which are capable of interfacing with the switching apparatus 20. More specifically, the central office may be any one of many conventional space division offices employing appropriate digital to analog conversion equipment for converting signals in PCM form appearing on the input lines 32 to analog signals before switching is accomplished. In the preferred embodiment the central office is a stored program controlled automatic exchange or switching sytem, as is known to those skilled in the art. It should be noted, however, that another switching apparatus 20 could serve as central office 24.

Figure 2:
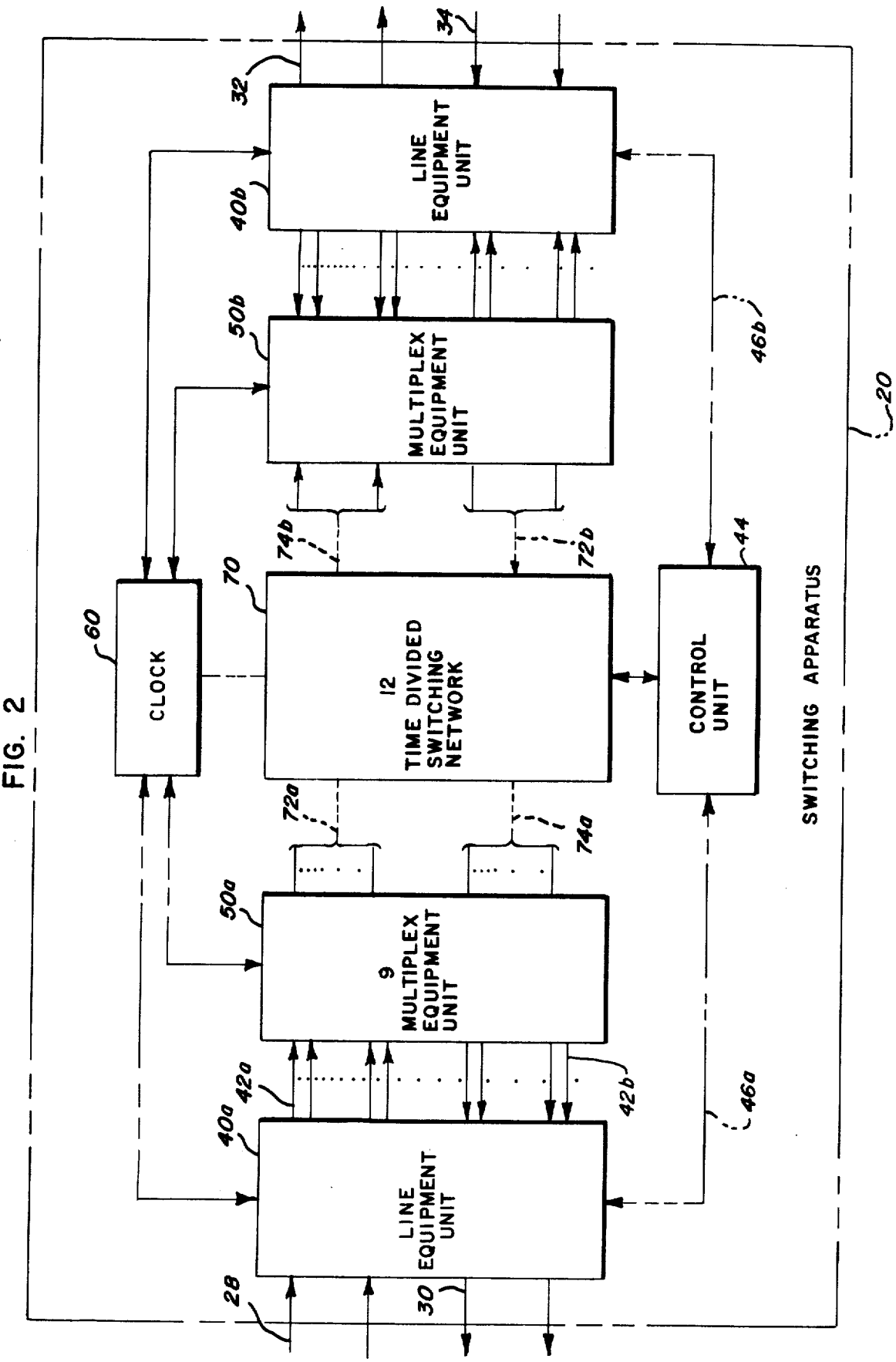
FIG. 2 is a general block diagram of the switching apparatus of FIG. 1.

In FIG. 2 the switching apparatus 20 is shown in greater detail. It includes a line equipment unit 40a which is connected to the above-described channel bank output lines 28 and channel bank input lines 30. The line equipment unit 40a is described fully in a copending application by M. J. Kelly et al., Ser. No. 532,540, filed Dec. 13, 1974 now U.S. Pat. No. 3,920,921. It suffices here to say that the line equipment unit 40a includes apparatus for converting the 24 channels of serial, 8 bit, PCM codes appearing in 24 time slots on each of the lines 28 into 8 lines on which sequentially appear the same PCM codes in parallel form. The line equipment unit 40a also accepts 24 channels of 8 bit parallel data and converts it to 24 channels in serial form, generating such signals on each of the output lines 30. Thus, the line equipment unit 40a has 8 output lines 42a for each of the lines 28 to which it is coupled and 8 input lines 42b for each of the lines 30 to which it is coupled. It should be noted that a similar line equipment unit 40b is connected to lines 32 and 34. Its function is similar to that described for line equipment unit 40a.

Both of the line equipment units also conduct supervisory scan functions for detecting supervisory information appearing in the respective bit streams. Such information is transferred to a control unit 44 over a bus 46a, for the unit 40a, and a bus 46b, for the unit 40b. The details of this detection operation and the operation of the control unit 44 with respect to the line equipment units are described fully in the aforementioned copending application.

In passing it should be noted that the detection of signaling information through the use of one or more dial pulses receivers (not shown) which may be coupled to certain of the lines 32 and 34 and which may be selectively connected by the switching apparatus to receive pulses for particular channels is also discussed in the aforementioned copending application. One digital dial pulse receiver suitable for such use is disclosed in U.S. Pat. No. 3,851,110 issued to M. J. Kelly et al. on Nov. 26, 1974. Since digit reception is both ancillary to the present invention and well known to those skilled in the art, presentation of details of such reception are limited herein to those details illustrative of the operation of our invention or necessary for an understanding of the environment in which our invention is employed.

The supervisory and signaling information detected is used as is known to those skilled in the art to determine the on hook/off status of the respective telephone station sets and to establish the desired destination for a call. The processing required for such information is well known to those skilled in the art and in the interest of a concise disclosure will not be expounded further here except to the extent such processing is related to this invention. For additional details of such processing see *Bell System Technical Journal*, September, 1964, Pages 2483 – 2574.

In addition, it should be noted that such other service circuits as are useful in conjunction with our invention are well known to those skilled in the art. Since they are also ancillary to this invention, no discussion of the operation and control of such service circuits is included here. For detailed information on the operation and control of such circuits, reference is made to *Bell System Technical Journal*, September, 1964, Pages 2221 – 2355, *Bell System Technical Journal*, October, 1969, Pages 2669 – 2764 and *Bell System Technical Journal*, December, 1970, Pages 2561 – 2624.

Also included in the switching apparatus 20 (FIG. 2) is a multiplex equipment unit 50a which is also described fully in the aforementioned copending application. It suffices here to say that the multiplex equipment unit 50a is connected to all 8 sets of 8 lines 42a from the line equipment unit 40a; it sequentially selects 1 PCM channel code word from each set of 8 lines 42a under control of a clock 60. Each such channel code selected is applied in parallel to a time divided switching network 70 over a subscriber channel outgoing bus 72a consisting of 8 lines. Thus, the PCM codes from all 8 channel banks are multiplexed onto the bus 72a, appearing in parallel form.

In like manner, parallel 8 bit PCM codes appearing on a subscriber channel incoming bus 74a from the network 70 and connected to the multiplex equipment unit 50a, are distributed to respective appropriate sets of 8 lines 42b for eventual transmission over the appropriate lines 30 in serial form to the respective channel banks. This again is under the control of the clock 60 as described in the aforementioned copending application.

It should be noted that the switching apparatus 20 includes an additional multiplex equipment unit 50b which is coupled to the line equipment unit 40b and to the network 70. The unit 50b functions similarly to the multiplex equipment unit 50a just described. In addition, the operation of the clock 60 in respect to the multiplex units and the line equipment units is also fully described in the aforementioned copending application.

Figure 3:
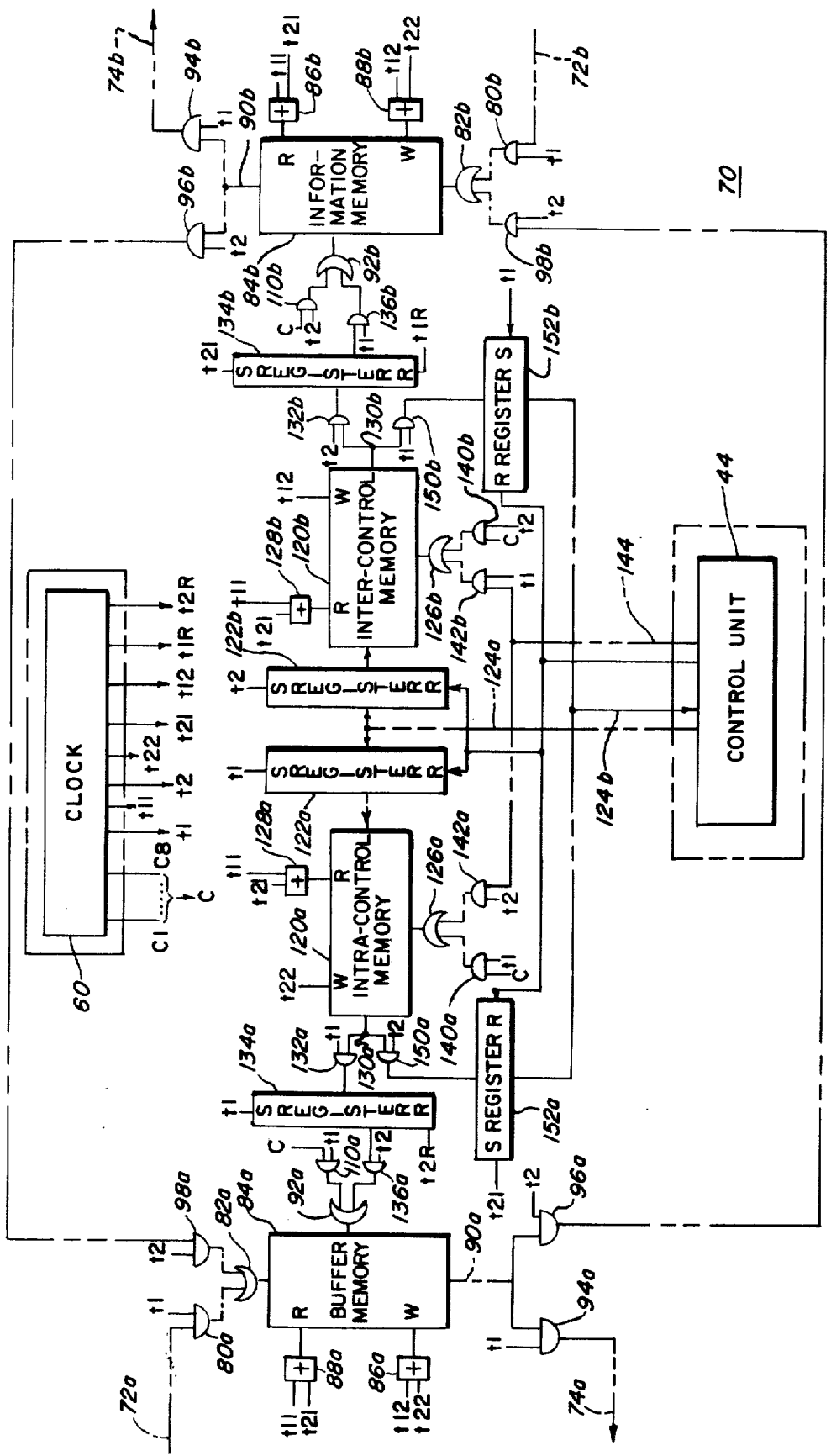
FIG. 3 is a detailed schematic block diagram of the time divided switching network shown in FIG. 2.

The time divided switching network 70 is shown in greater detail in FIG. 3. It includes a plurality of memories selectively controlled to: (1) store PCM codes received in parallel from the multiplex equipment units; (2) selectively transfer such codes between memories to effect necessary changes in the channels (time slots) assigned to the codes; and (3) transmit them either back to the respective multiplex equipment unit from which they were received or to the respective other multiplex equipment unit and thus to the distant central office.

Figure 4:
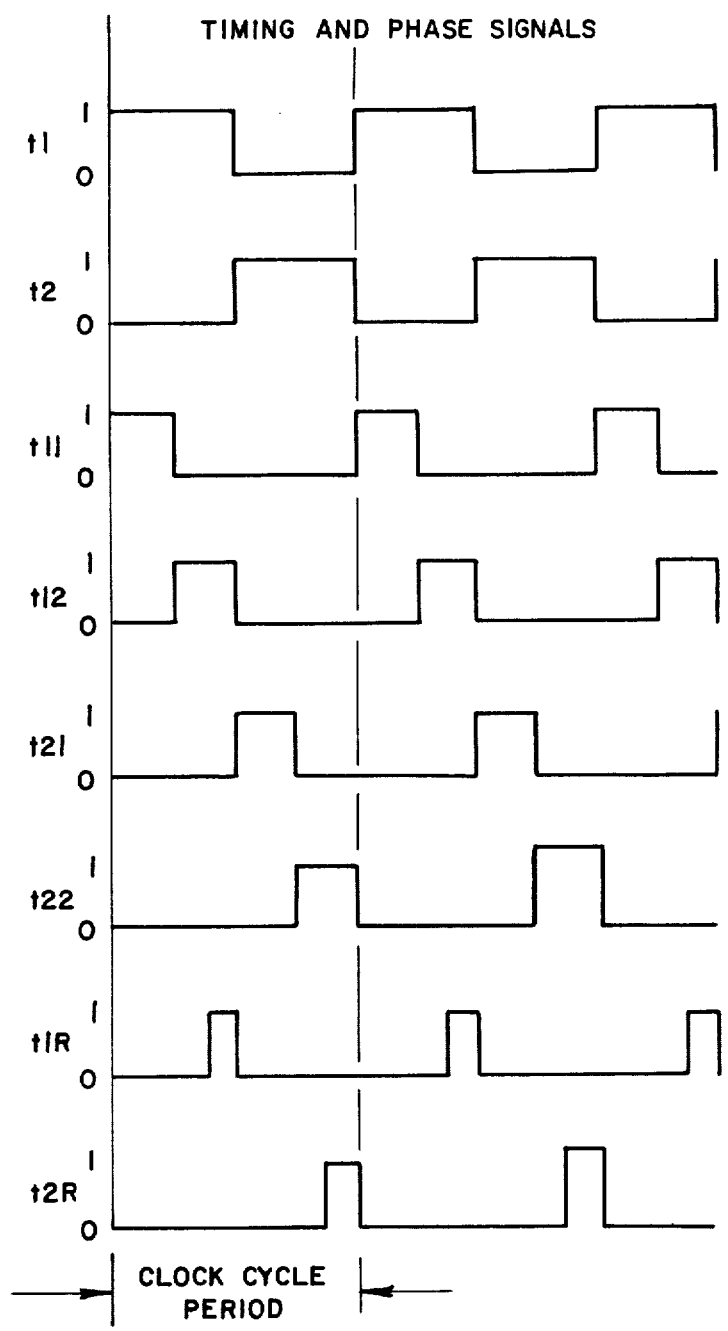
FIG. 4 is a representation of the timing and phase signals generated by the clock of FIG. 3.

More specifically, incoming codes on the 8 line bus 72a are applied to a bus AND gate 80a. The bus AND gate 80a comprises 8 individual AND gates connected to respective ones of the lines comprising the bus 72a. All of such AND gates are, however, connected to a common control lead which in this instance is connected to a timing signal *t*This timing signal will be discussed in greater detail below; however, it may be noted that the timing or clock phase signal *t*1 and various additional timing signals used in the network 70 are produced by the aforementioned clock 60 using apparatus known to those skilled in the art; these signals are represented in FIG. 4.

Code signals appearing on the bus 72a (FIG. 3) are gated under the control of the signal t1, i.e., when the signal t1 is equal to logical "1", to the bus OR gate 82a which comprises 8 individual OR gates each having an input coupled to the output of a corresponding one of the AND gates comprising the bus AND gate 80a. The output of the bus OR gate 82a, comprising 8 individual OR gate outputs, is connected to a buffer memory 84a. The buffer memory 84a is in turn, responsive to the logical OR of the timing or clock sub-phase signals t12 and t22, appearing at the output of an OR gate 86a, to write code signals appearing at the output of the bus OR gate 82a into the memory. In like fashion, the buffer memory 84a is responsive to the logical OR of the signals t11 and t21 at the output of an OR gate 88a to read code signals from the memory and apply them to a memory output bus 90a. In either instance, the buffer memory writes to or reads from the address appearing at the output of a bus OR gate 92a to be discussed more below.

It should be noted that the network 70 also includes an information memory 84b for storing channel codes and to which the bus 72b is coupled through a bus AND gate 80b and a bus OR gate 82b. The operation of the information memory and the gating of codes into and out of that memory is quite similar to that described above for the buffer memory; therefore, in the interest of brevity and a concise specification, as little additional discussion of such similar operation as possible is included herein. It should be noted, however, that gating elements associated with the information memory which correspond to similaly functioning elements associated with the buffer memory are denoted in the drawings with the same basic reference number as the corresponding element but with the literal a replaced by the literal b. In addition, the information memory 84b includes in the preferred embodiment only 96 storage locations, one-half of the 192 storage locations of the buffer memory 84a as will become apparent below. This reduced memory capacity for the information memory is due to a desired concentration ratio of 2 to 1 through the switching network.

Code signals appearing on the buffer memory output bus 90a are gated through a bus AND gate 94a during timing phase t1 for application to multiplex equipment unit 50a. Similarly, code signals appearing on the information memory output bus 90b are gated through the bus AND gate 94b during the same timing phase to the bus 74b.

Code signals appearing on the bus 90a are also gated through a bus AND gate 96a during timing phase t2 to the input of a bus AND gate 98b and signals appearing on bus 90b are gated through the bus AND gate 96b to a bus AND gate 98a. The bus AND gate 98a is coupled to the bus OR gate 82a previously mentioned, providing a path for transferral of stored code signals from the information memory to the buffer memory. A like path for transferral of data from the buffer memory to the information memory also exists since the bus AND gate 98b is coupled to the bus OR gate 82b.

From the above it should be observed that during clock phase t1 code signals are read from the buffer memory to the bus 74a and written into that memory from the bus 72a. Similarly, during clock phase t1 code signals are read from the information memory to the bus 74b and written into that memory from the bus 72b. No code signal transfer between the two memories can occur during timing phase t1. However, during phase t2 code signals are transferred between the two memories; the significance of this observation will become apparent in the following discussion.

The addressing of the buffer and information memories is controlled alternately by the clock 60 and by two additional memories. More specifically, the clock 60 sequentially counts from 1 to the number of channels of the channel buses 72a and 72b which in the illustrative embodiment is 192. Encoded count signals are generated on a plurality of lines (in the illustrative embodiment, 8 lines) collectively referred to as the C bus and are applied to a bus AND gate 110a which is connected to the previously mentioned bus OR gate 92a. The gating signal for the bus AND gate 110a is the phase signal t1; therefore, during phase t1 of each clock cycle, the encoded count signals on the C bus control the addressing of the buffer memory. As a result, during successive t1 clock phases, the buffer memory advances sequentially through its channel code storage locations, reading codes from the respective locations and storing new codes into them. More specifically, during each clock sub-phase t11, the then addressed location is read and its contents are applied to the bus 74a. Thereafter, during the respective clock sub-phase t12, the code appearing on the bus 72a is written into the addressed channel code storage location. It should be noted that the clock 60 and the code transmission rate are synchronized as described in the aforementioned copending application to permit the buffer memory to receive code signals from the bus 72a at the appropriate time.

Unlike the buffer memory, the information memory responds to addresses appearing on the C bus during clock phase t2. More specifically, the C bus is coupled to a bus AND gate 110b which is coupled through the bus OR gate 92b to the address input for the information memory. The gating signal for the gate 110b is the phase signal t2. Therefore, during clock phase t2 of each clock cycle, the encoded count signals on the C bus control the addressing of the information memory. As a result during successive t2 clock phases, the information memory advances through its channel codes storage locations reading codes from the respective storage locations and writing new codes into them. It should here be noted that since the information memory in this illustrative embodiment has only 96 storage locations, each storage location is read and written twice in the time required to read and write the 192 locations of the buffer memory once.

More specifically, during each clock sub-phase t21, the then addressed location of the information memory is read and its contents are applied through the bus AND gates 96b and 98a and the bus OR gate 82a to the buffer memory 84a for storage. Thereafter, during the respective clock sub-phase t22, the code appearing on the bus 90a from the buffer memory is gated through the bus AND gates 96a and 98b and the bus OR gate 82b and is stored in the information memory. It should be noted that with some types of gates, it may be advantageous to connect a capacitor of appropriate capacity to the output of the gates 98a and 98b to ensure the presence of the code signals from the information memory and buffer memory for an adequate period to be properly stored in the buffer memory and the information memory, respectively.

As was mentioned above, the addressing of the buffer and information memories is also controlled by two additional memories. The first of these is an intra-conol memory 120a. The intra-control memory contains the same number of storage locations as does the buffer memory (in the illustrative embodiment, 192) and receives data for storage from a register 122a which, in turn, is coupled to a data bus 124a from the control unit 44. Data appearing on the data bus 124a is set into the register 122a upon the occurrence of the timing signal t1 and is applied to the input of the intra-control memory. That memory is addressed by signals appearing at the output of a bus OR gate 126a. The addressed storage location is read in response to the logical OR of the clock signals t21 and t11, appearing at the output of an OR gate 128a. The memory writes the data stored in the register 122a into the addressed location upon the occurrence of the clock timing signal t22.

Data read from a location of the intra-control memory is applied to an output bus 130a which, in turn, is coupled through a bus AND gate 132a to a register 134a; the timing signal t1 controls the gating of the bus AND gate 132a. Thus, at the occurrence of the clock phase t1, data signals read from the intra-control memory are applied to the register 134a and stored therein. The register 134a serves as temporary storage for these data signals and applies them to a bus AND gate 136a. The gating signal controlling the operation of the bus AND gate 136a is the timing signal t2. Consequently, during each t2 clock phase, signals derived from the intra-control memory are applied to the bus OR gate 92a and, in turn, address the buffer memory. Thus, it is the contents of the intra-control memory which determine the particular channel storage location selected for gating, during the phase t2, to the information memory.

The second of the two additional memories mentioned above is an inter-control memory 120b. The inter-control memory and its associated input register and output gating and output register are quite similar to that described for the intra-control memory. Specifically, register 122b coupled to the data bus 124a is set on the occurrence of the clock phase t2 and is coupled to the input of the inter-control memory. The inter-control memory is addressed by signals appearing at the output of a bus OR gate 126b. Data signals are read from the addressed location of the inter-control memory in response to the logical OR of timing signals t11 and t21, appearing at the output of the OR gate 128b and data are written into the inter-control memory upon the occurrence of the timing signal t12. Signals read from the inter-control memory are applied to a bus 130b which, in turn, is connected to a bus AND gate 132b. The clock timing signal t2 controls the gating of the bus AND gate 132b which is coupled to a register 134b. That register is set according to the data appearing at the output of the gate 132b at the occurrence of the clock timing signal t21 and applies the data stored therein to a bus AND gate 136b. The clock timing signal t1 controls the gating of the gate 136b and the application of the contents of the register 134b to the bus OR gate 92b. Consequently, during the phase t1, contents of the inter-control memory control the addressing of the information memory.

As was mentioned above, the output of the bus OR gate 126a is applied to the address data input of the intra-control memory. One of the inputs to the gate 126a is the output of a bus AND gate 140a to which the C bus is connected and which is controlled by the timing signal t1. The other input of the bus OR gate 126a is the output of a bus AND gate 142a. The gate 142a is connected to an address bus 144 from the control unit 44 and is controlled by the timing signal t2.

Thus, during successive t1 clock phases, the intra-control memory advances sequentially through its storage locations reading stored data therefrom. During successive t2 phases, however, the particular address selected to be read or written into is determined by the control unit 44 as will be described in more detail below.

The inter-control memory is addressed in a similar fashion to that just described for the intra-control memory; however, the C bus is connected to a bus AND gate 140b which is controlled by the timing signal t2 rather than the timing signal t1. The output of this bus AND gate is applied to previously mentioned bus OR gate 126b. In addition, the address bus 144 from the control unit 44 is connected to a bus AND gate 142b which is controlled by the timing signal t1 and connected to the bus OR gate 126b. Therefore, during successive t2 phases the inter-control memory advances sequentially through its storage locations reading data from the respective locations. During successive t1 phases, the particular inter-control memory location addressed is determined by data appearing on the address bus 144.

It should be noted that the outputs of both the intra-control memory and the inter-control memory are observable by the control unit 44. More specifically, the output bus 130a from the intra-control memory is connected to a bus AND gate 150a which is controlled by the timing signal t2. The output of that bus AND gate is connected to a register 152a, which is set by the timing signal t21; the output of that register is connected to the data bus 124b terminating at the control unit 44. In like manner, the output bus 130b for the inter-control memory is connected to a bus AND gate 150b controlled by the timing signal t1. The output of that gate is connected to register 152b which is set by the timing signal t1 and which is coupled to the data bus 124b. Thus, the control unit 44 supplies the data to be stored in both the intra and inter-control memories through the registers 122a and 122b respectively, and observes data read from these memories in the registers 152a and 152b, respectively. Further, it is capable of determining specific addresses to be accessed in each of these memories.

The control unit 44 for the illustrative embodiment may comprise any one of a number of known and/or commercially available processing units having an output data bus, an input data bus, an address bus, and discrete signal ports. One such is disclosed in U.S. Pat. No. 3,818,455 issued June 18, 1974 to E. F. Brenski et al. In the preferred embodiment, the control unit comprises an Intel Corporation micro computer Model 8080 connected in a basic configuration known to those skilled in the art. See *From CPU to Software*, Intel Corporation, 1974, Page 25. The actual programming of this processor to accomplish the specific functions necessary to control the above-described time divided switching network involves memory searching and selective data storage operations well within the skill of those skilled in the art, when guided by the subsequent discussion of the operation of that switching network. Nevertheless, a flow chart for an illustrative portion of the control programming together with a listing of the correlative assembly language program for the Model 8080 computer is included in the Appendix. The particular program portion shown is that used to connect a channel to a digital dial pulse receiver of the type above-described. This portion of the programming is doubly illustrative in that it demonstrates programming for so connecting such a receiver and also the programming principles for connecting two channels together across the switching network, as is described in detail below.

In the operation of our invention, and specifically, the time divided switching network, above-described, there are two modes of operation. The first of these is the intra-switch mode or call in which one of the telephone station sets 26 (FIG. 1) coupled through a channel bank 22 to the switching apparatus 20 is to be connected to another of the telephone station sets similarly coupled to that switching apparatus 20. Such a call requires what is referred to as remote switching. In processing this call, the well known functions of scanning for line origination, performing necessary translations, returning dial tone, collecting digits and performing additional necessary translations are accomplished as is well known in the art and described amply above and in the aforementioned copending application and the *Bell System Technical Journal* of September of 1964. Having determined the appropriate destination for the call, the switching network is exercised to develop the required connection between the two station sets. For purposes of illustration, an example will be employed in the discussion below to describe the process of accomplishing such connection through the switching network 70 (FIG. 2).

Referring to FIGS. 5A through 5D, the various memories employed in the switching network 70 are shown with selected of their storage locations shown in schematic form. The numbers appearing adjacent certain of the locations identify the respective addresses of such locations. For purposes of this discussion, it is assumed that the station set associated with channel (time slot) "15" of the 192 channels appearing on bus 72a is to be connected to the station set associated with channel (time slot) "97".

The first function of the control unit 44 is to locate a vacant channel code storage location in the information memory. This is accomplished by searching the intra-control memory for a storage location containing all "0"'s which is used as the idle code. Alternately a location map, as is well known, may be employed, having one bit assigned to each channel storage location in the information memory and having a "0" stored in bits assigned to idle channels. A search of such a map stored in the memory of the control unit 44 may be conducted easily and quickly. This method is used in the appended program.

Figure 5D:
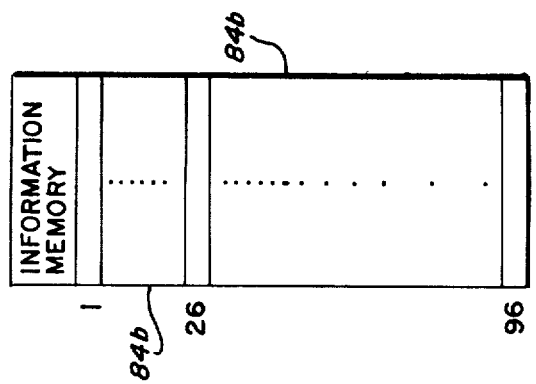
FIGS. 5A through 5D are pictorial representations of data storage and transfer for a particular exemplary intra-switch operation.
Figure 5C:
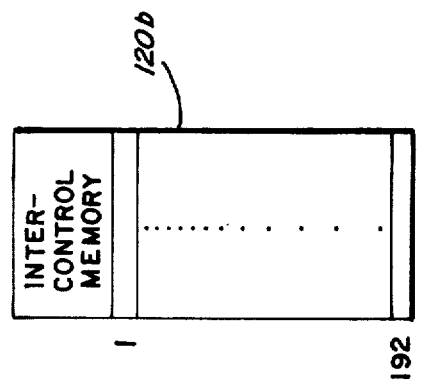
Figure 5B:
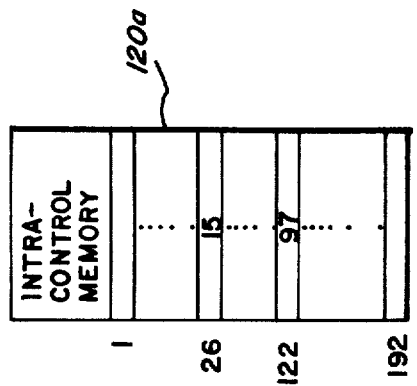
Figure 5A:
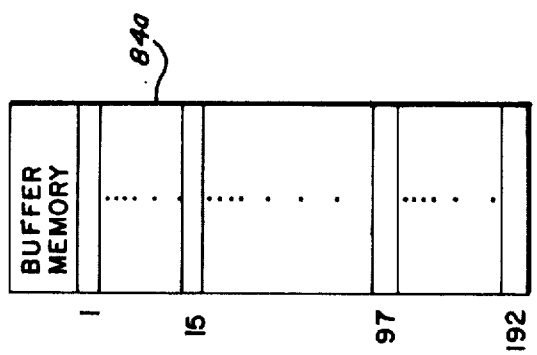
Figure 6D:
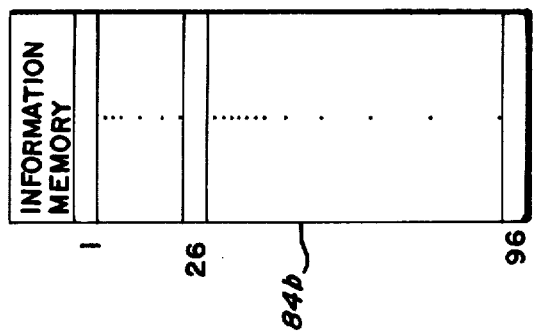
FIGS. 6A through 6D are pictorial representations of data storage and transfer for a particular exemplary inter-switch operation.
Figure 6C:
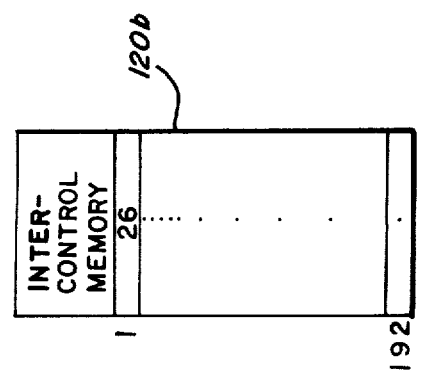
Figure 6B:
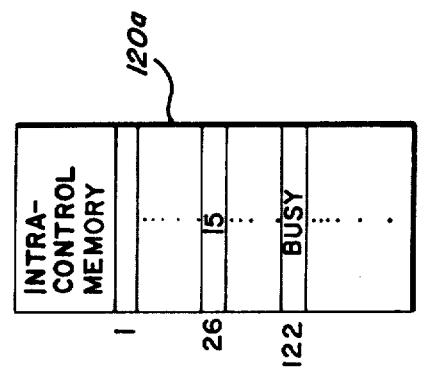
Figure 6A:
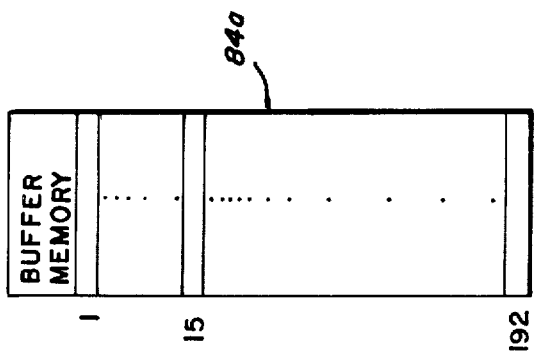

It is assumed here that the storage location 26 in the intra-control memory contains an idle code. At this point, the control unit 44 applies encoded signals denoting the address "26" to the bus 144 and substantially simultaneously applies encoded signals denoting the number "15" corresponding to the channel of the originating station set to the data bus 124a. Thereafter, at the first occurrence of phase signal $t1$, the data appearing on the data bus 124a is set in register 122a. Subsequently, when the phase signal $t2$ gates the address data on the bus 144 through the bus AND gate 142a and the bus OR gate 126a the code stored in the register 122a is transferred to intra-control memory location 26. This is illustrated in FIG. 5B wherein the storage location 26 in the intra-control memory 120a is shown storing the number "15".

Thus, when as described above, the clock count reaches "26" and the intra-control memory is addressed during phase $t1$ through the bus AND gate 140a and bus OR gate 126a, the memory outputs the appropriately encoded number "15" to the bus 130a. In addition, that coded number is stored in the register 134a at time $t1$ for subsequent use during phase $t2$ to address the buffer memory. It should be noted that substantially simultaneously in phase $t1$ the clock count signals encoding the number "26" are gated through the bus AND gate 110b and the bus OR gate 92b to address the information memory 84b. Here it must be recalled that during the first half of phase $t2$ i.e., during sub-phase $t21$ code signals stored in the addressed information memory channel location are read and gated through bus AND gate 96b to the input of the buffer memory 84a and substantially simultaneously code signals stored in the addressed buffer memory location are gated through the bus AND gate 96a to the input of the information memory 84b. Thereafter, during sub-phase $t22$ code signals appearing at the inputs of the two respective memories are stored in the addressed locations. In the illustrative example mentioned above, data is thus exchanged between channel location 15 of the buffer memory and channel location 26 of the information memory.

The control unit 44 also stores, in the same manner as described above, a code representing the number "97" in the storage location 122 of the intra-control memory. The number "97" is the channel identification number for the destination station set and the storage location 122 is selected since it corresponds to the storage location 26, modulo 96. More specifically, since the information memory includes only 96 locations, its location 26 is addressed in the clock cycles when location 26 or 122 of the intra-control memory is addressed in response to C bus signals.

With the above-described data stored in the intra-control memory, it should be apparent that channel location 26 in the information memory is employed as a mutual repository for information from either of the station sets. Specifically, code signals from buffer memory channel location 15 are reposited in information channel location 26. Later those code signals are transferred to buffer memory channel location 97 which then reposits its code signals in information memory channel location 26 to be transferred subsequently to buffer memory channel location 15.

Referring to FIGS. 6A through 6D, when the user of a telephone station set 26 makes a call requiring connection with another telephone station set not directly connected to the switching apparatus 20, access must be had to the central office 24. Such a call is referred to as an inter-switch call and is accomplished in much the same fashion as that described above. Again, for purposes of illustration, an example will be employed to describe the operation of the switching network 70.

Specifically, it is again assumed that the calling station set is assigned channel (time slot) 15. The intra-control memory is first searched by the control unit for a storage location containing the idle code all "0"'s. This may be accomplished by sequentially reading the intra-control memory locations and observing the results on bus 124b from register 152a. Alternatively, if desired, a map of available locations and thus, channels, may be maintained in the memory of the control unit. In any event here it is assumed that location 26 is vacant. As a result, in the manner described above, the control unit 44 stores a code denoting "15" in intra-control memory location 26. In this instance, however, location 122 of that memory need have no specific code stored therein except a busy code since data deposited in information memory channel location 26 from the buffer memory is not to be returned to any channel location in the buffer memory. It is necessary, however, that location 122 of the intra-control memory be assigned a busy code to prevent its selection for a subsequent call; the busy code is all "1"'s.

Thereafter, the inter-control memory (or the buffer memory map) is searched for a memory location containing the idle code. In this instance it is assumed that inter-control memory location 1 contains such a code. This particular location, as will be seen below, identifies channel 1 of the buses 72b and 74b as the conduit channel for the information appearing in channel 15 in the buffer memory. A code corresponding to the number "26" is stored in inter-control memory location 1. Referring to FIGS. 6A through 6D, pictorial representations of the memories and the pertinent data stored therein are shown.

After the memories have been set up as described above, operation of the switching network is as follows. When the clock count reaches "26", the code signals are exchanged between buffer memory channel 15 and information memory channel location 26. Since the process of exchange is substantially as described earlier in connection with an intra-switch call, no additional discussion of that transfer is included here. However, when the clock counter reaches a count of "1", the code appearing on the C bus is gated during phase t2 through bus AND gate 140b and bus OR gate 126b to the inter-control memory address input. As a result, the contents of inter-control memory location 1, namely, the code signals denoting the number "26", are read from that memory and applied to the bus 130b. These code signals are then gated into the register 134b and stored. Thereafter, during the phase t1 the code signals denoting the number "26" are gated to the information memory where they are employed as addressing information. Thus, during the phase t1 the addressed channel location of the information memory is location 26. As a result, during phase t1 code signals stored in that location are read and gated to the bus 74b, in channel 1 for that bus. Subsequently, during sub-phase t12, code signals received on the bus 72b are gated to the input of the information memory and stored in channel location 26. Thus, information memory channel storage location 26 is used as an intermediate repository for code signals on buses 72a and 74a in channel 15 and on buses 72b and 74b in channel 1.

APPENDIX

The following flow chart and program are illustrative of programming processes useful in connection with our invention. This particular program couples a predetermined originating channel to a digital dial pulse receiver channel. In this program a memory map (stored in the memory of the control unit 44) for the information memory is used to indicate the busy/idle status of particular time slots ("TS") or channels. A "0" stored in a particular bit in the map indicates that a corresponding storage location (channel) in the information memory is idle. In the illustrative embodiment the map comprises twelve 8 bit words with the first word containing map bits for time slots 88 through 95 and the last word containing map bits for time slots 0 through 7. During a search of this map, a register "D" contains the current map word address and a register C contains the current map bit address.

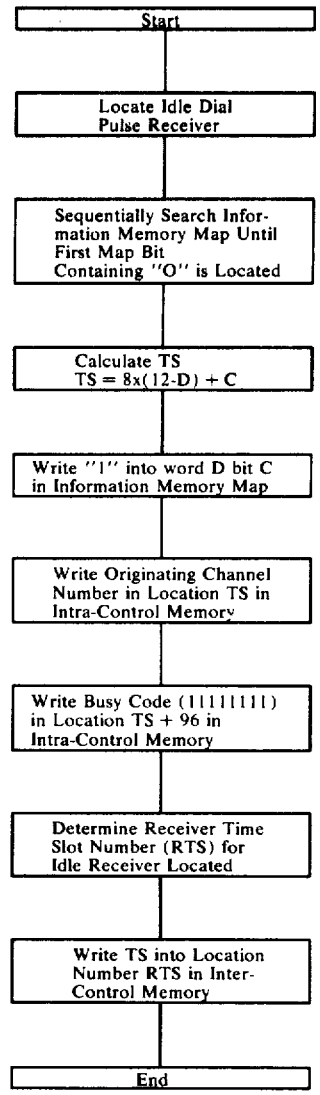

FLOW CHART

PROGRAM

| | | |
|---|---|---|
| RCR SCAN | LXI H <B$_1$> <B$_2$> | ADD. REC. MAP |
| | MOV A, M | |
| | MVI B, <B$_3$> <B$_3$>=8 | |
| LOOP | RAL | |
| | JC PATH SCAN | |
| | DCR B | |
| | JZ NOIDLEREC | |
| | JMP LOOP | |
| PATH SCAN | LXI H <B$_1$> <B$_2$> | ADD. TS MAP |
| | MOV A M | |
| | MVI D, <B$_3$><B$_3$>=12 | |
| LOOP 2 | MVI C, <B$_4$> <B$_4$>=8 | |
| LOOP 1 | RAL | |
| | JC TS NO. | |
| | DCR C | |
| | JZ NEXTWORD | |
| | JMP LOOP 1 | |
| NEXTWORD | DCR D | |
| | JZ NOIDLEPATH | |
| | JMP LOOP 2 | |
| TS No. | MVI A, <12> | |
| | SUB D | |
| | RLC | |
| | RLC | |

PROGRAM-continued

```
                RLC
                ADD C
                MOV C, A
INTRACONMEM     LXI H  INTRANETCON
                MOV D, M
                INX H
                MOV E, M
                ADC E
                JNC NOCAR
                INR D
NOCAR           MOV E, A
                LXI H  TERM 1
                MOV A, M
                STAX D
                MVI A  <96>
                ADC E
                JNC  NOCAR 2
                INR D
NOCAR 2         MOV E, A
                LXI H  TERM 2
                MOV A, M
                STAX D
INTERCONMEM
                MOV A, B
                RLC
                RLC
                RLC
                LXI H  INTERNETCONT
                MOV D, M
                INX H
                MOV E, M
                ADC E
                JNC  NOCAR 3
                INR D
NOCAR 3         MOV E, A
                MOV A, C
                STAX D
```

While the above description of our invention is presented in connection with a particular illustrative embodiment, it is by no means intended to be limited to that embodiment. Rather, it is our intention to encompass all embodiments of the principles of our invention as are properly within the spirit and scope of the appended claims.

What is claimed is:

1. Time divided switching apparatus for use with a first channel bus for conducting digital code signals, comprising:
    a first memory means having a first set of storage locations;
    first means adapted for selectively coupling said first memory means to receive code signals from such first channel bus;
    a second memory means having a second set of storage locations;
    second means for selectively coupling said second memory means to said first memory means for transfer of stored code signals to said first memory means;
    third means for selectively coupling said first memory means to said second memory means for transfer of stored code signals to said second memory means;
    clock means for generating control signals defining at least two phases of operation of said apparatus and for generating sequential address signals, said first memory means being responsive to said sequential address signals during a first of said phases and said second memory means being responsive to said sequential address signals during a second of said phases;
    means for storing address codes; and
    means responsive to said means for storing address codes for generating additional address signals for controlling said first memory means during said second phase and for controlling said second memory means during said first phase;
    said first, second, and third means being individually coupled to said clock means to be responsive to predetermined ones of said control signals.

2. Time divided switching apparatus as in claim 1 further comprising fourth means adapted for selectively coupling said first memory means to transfer stored code signals to said first channel bus in response to at least a predetermined one of said control signals.

3. Time divided switching apparatus as in claim 2 wherein said means for storing address codes comprises:
    a third memory means; and
    a fourth memory means; and wherein;
    said means for generating additional address signals is responsive to said third memory means for controlling said first memory means during said second phase and to said fourth memory means for controlling said second memory means during said first phase.

4. Time divided switching apparatus as in claim 1 wherein said control signals comprise a first phase signal and a second phase signal and said second and third means are each coupled to said clock means to be responsive to said second phase signal.

5. Time divided switching apparatus as in claim 4 wherein said first means is coupled to said clock means to be responsive to said first phase signal.

6. Time divided switching apparatus as in claim 5 further comprising fourth means responsive to said first phase signal and adapted for selectively coupling said first memory means to transfer stored code signals to said first channel bus.

7. Time divided switching apparatus as in claim 1 for use with a second channel bus for conducting digital code signals, further comprising:
    fourth means adapted for selectively coupling said second memory means to receive code signals from said second channel bus;
    said fourth means being coupled to said clock means to be responsive to at least a predetermined one of said control signals.

8. Time divided switching apparatus as in claim 7 further comprising fifth means adapted for coupling said second memory means to transfer stored code signals to said second channel bus;
    said fifth means being coupled to said clock means to be responsive to at least a predetermined one of said control signals.

9. Time divided switching apparatus as in claim 8 wherein said control signals comprise a first phase signal and a second phase signal and said fourth and fifth means are each coupled to said clock means to be responsive to said first phase signal.

10. Time divided switching apparatus as in claim 9 further comprising sixth means adapted for selectively coupling said first memory means to transfer stored code signals to said first channel bus;
    and wherein:
    said first and sixth means are each coupled to said clock means to be responsive to said first phase signal; and
    said second and third means are coupled to said clock means to be responsive to said second phase signal.

11. Time divided switching apparatus as in claim 10 wherein said means for storing address codes comprises:
   a third memory means; and
   a fourth memory means;
   and wherein;
   said means for generating additional addressing signals is responsive to said third memory means for controlling said first memory means during said second phase and to said fourth memory means for controlling said second memory means during said first phase.

12. A switching network for use with at least one time division multiplexed bus having incoming and outgoing segments, each segment having a predetermined number of time divided channels, each of such time divided channels being adapted to transmit any one of a plurality of codes, comprising:
   first memory means for storing any one of such codes for each channel in a storage location identified by a unique address;
   second memory means for storing any one of such codes for each of a plurality of such channels in any one of a plurality of storage locations, each identified by a unique address;
   address generation means for generating first sequential addresses;
   third memory means for storing predetermined second addresses;
   addressing means responsive to said address generation means for addressing said first memory means and to said third memory means for addressing said second memory means and alternately responsive to said address generation means for addressing said second memory means and to said third memory means for addressing said first memory means; and
   gating means including means for gating the contents of the location of said first memory means addressed by said addressing means to alternately said outgoing segment of said time division multiplexed bus and said second memory means, and means for gating to said first memory means alternately the contents of the location of said second memory means addressed by said addressing means and said incoming segment of said time division multiplexed bus.

* * * * *